No. 772,451. PATENTED OCT. 18, 1904.
M. A. BASLEY.
GEARING FOR WASHING MACHINES.
APPLICATION FILED JUNE 8, 1904.
NO MODEL. 2 SHEETS—SHEET 2.
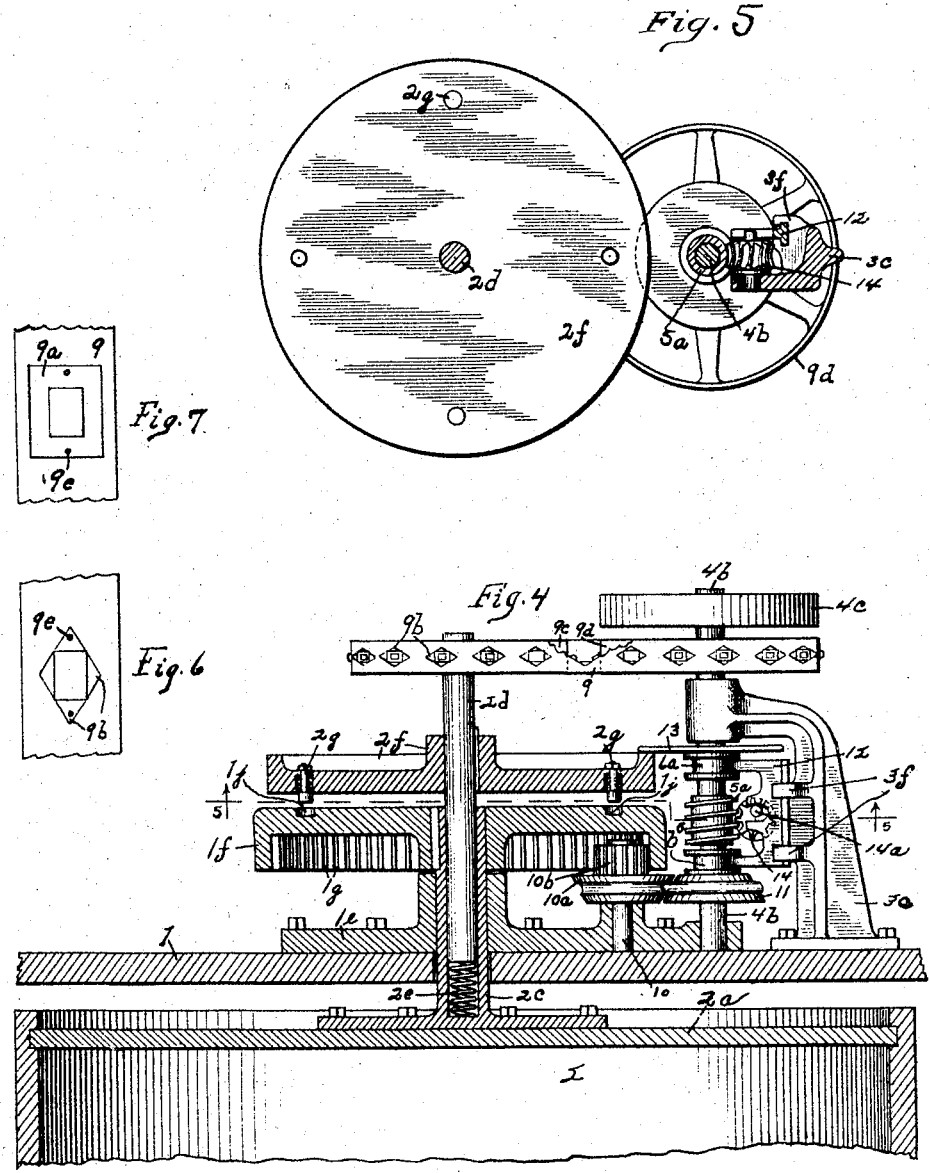

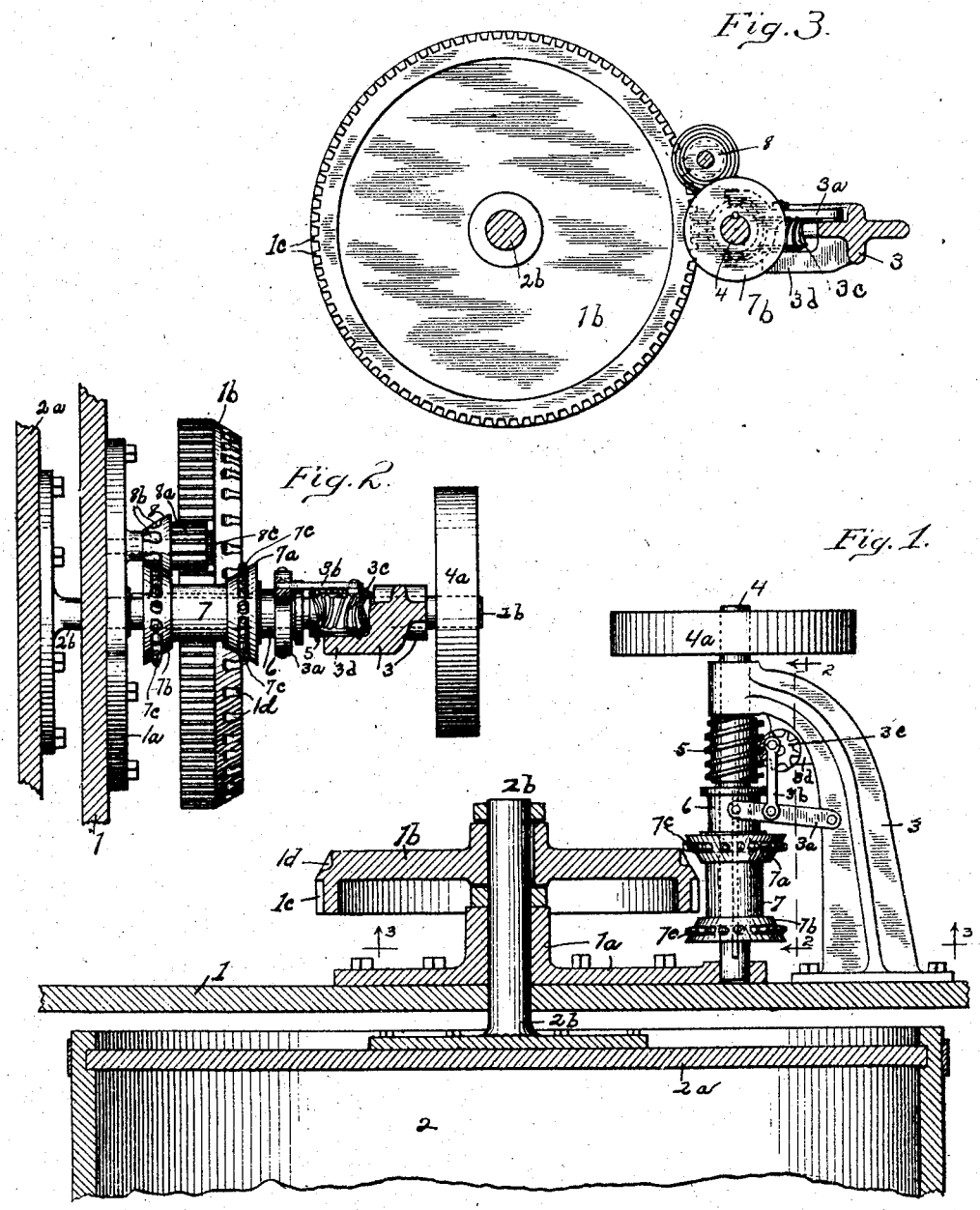

No. 772,451.

Patented October 18, 1904.

UNITED STATES PATENT OFFICE.

MANFRED ALONZO BASLEY, OF CHICAGO, ILLINOIS.

GEARING FOR WASHING-MACHINES.

SPECIFICATION forming part of Letters Patent No. 772,451, dated October 18, 1904.

Application filed June 8, 1904. Serial No. 211,589. (No model.)

*To all whom it may concern:*

Be it known that I, MANFRED ALONZO BASLEY, a citizen of the United States, residing at Chicago, in the county of Cook and State of Illinois, have invented certain new and useful Improvements in Gearing for Washing-Machines, of which the following is a specification.

This invention relates to improvements in means for giving a reciprocating movement to the cylinders or barrels which form the receptacles of certain types of washing-machines, churns, and like devices.

The especial object of my improvements is to provide driving means that will be durable, in which there will be little lost motion, and in which provision is made for compensating for the wear of the parts.

In the accompanying drawings, which form a part of this application, I have shown a preferred and modified method of carrying out the above-named objects in the following views.

Figure 1 is a view, partly in plan elevation and partly in horizontal section, showing my invention as applied to the head of a washing-machine barrel. Fig. 2 is a view on the line 2 2 of Fig. 1. Fig. 3 is a view on the line 3 3 of Fig. 1. Fig. 4 is a view, partly in section and partly in plan, showing a modification of the construction illustrated in Fig. 1. Fig. 5 is a view on the line 5 5 of Fig. 4; Fig. 6, a fragmentary view of a form of driving-belt which I prefer to use in connection with the construction shown in Fig. 4, and Fig. 7 a view of the opposite side of same.

Referring to the details of the drawings, 1 represents a portion of a supporting-frame, to which my improved driving mechanism is bolted in any suitable manner and in which is journaled the axle $2^b$, the hub or base of which is bolted to the head $2^a$ of the barrel 2. A bearing-plate $1^a$ serves to reinforce the frame 1 and to furnish an additional bearing for the axle $2^b$. Keyed on the axle is a gear-wheel $1^b$, having in its straight face cogs $1^c$ and provided in its beveled face with a series of notches or recesses $1^d$. Bolted to the frame 1 is a bracket 3, in the outer end of which is journaled a horizontal shaft 4, the inner end of which is journaled in the base of the plate $1^a$. Secured to the outer end of the shaft 4 is a pulley $4^a$, which is adapted to be driven from any suitable power. The bracket 3 is formed with an extension $3^d$ near its outer end, in which is journaled a worm-gear $3^c$, on one side of which is pivoted a link $3^b$, the other end of which is connected with a forked lever $3^a$, one end of which is pivoted on the bracket 3. Fixed on the shaft 4 is a worm 5, the teeth of which mesh with the teeth of the worm-gear $3^c$.

Slidably mounted on the shaft 4, near the worm-gear, is a sleeve or spool 6, which is secured to the pinions $7^a$ $7^b$, which are connected by the hub 7, which is splined on shaft 4. The pinions $7^a$ $7^b$ have set in their peripheries studs $7^c$, those in the pinion $7^a$ being adapted to project into or engage the recesses $1^d$ in the gear $1^b$ when the said pinion is moved inwardly by the action of the clutch, which is composed of the spool 6, lever $3^a$, and the link $3^b$. The studs of the pinion $7^b$ are adapted to engage the recesses $8^b$, formed in a beveled pinion 8, which is mounted on the stud-shaft $8^c$, fixed in the plate $1^a$, which also carries a small pinion $8^a$, which meshes with the cogs $1^c$ of the gear-wheel $1^b$.

It will be apparent that the operation of the gearing just described will serve to drive the gear-wheel $1^b$ in an opposite direction to that effected through the intermeshing of the pinion $7^a$ and said gear-wheel and that owing to the reciprocation of the spool 6, to which the pinions $7^a$ $7^b$ are secured, there will be a constant change in the position of said pinions, thereby changing the direction of the rotation of the barrel and producing a reciprocating movement, which is desirable in washing-machines of this type.

In lieu of the form of gearing and driving mechanism above described I may in some instances utilize the form shown in Figs. 4 and 5, in which a hollow shaft $2^c$ is bolted to the head of the barrel $2^a$ and has placed therein a shaft $2^d$, the inner end of which rests on a coil-spring $2^e$, housed in said hollow shaft $2^c$, which is journaled in the plate $1^e$, which is bolted to the frame 1 and has keyed thereon the gear-wheel $1^f$, provided with internal cogs $1^g$, and has in its outer face a series of recesses $1^j$. Keyed on the shaft $2^d$ is a disk $2^f$, in which are inserted a series of pins $2^g$, the shanks of which are surrounded by small coil-springs, which serve to keep said pins normally projected from the face of said disk $2^f$, so that upon the desired movement of said disk $2^f$ said pins will be pushed into the recesses $1^j$ in the wheel $1^f$. Bolted to the frame 1 is a bracket $3^c$, in the outer end of which is journaled a shaft $4^b$, the inner end of which is journaled in the plate $1^c$. On this shaft is secured a worm $5^a$, and on either side of same are spools or sleeves $6^a$ $6^b$. Adjacent to the spool $6^a$ a disk 13 is mounted on the shaft $4^b$, and near the spool $6^b$ a beveled friction-pinion 11 is mounted. In the bracket $3^e$ there are offsets $3^f$, in which are formed bearings for the slidable yoke 12, which is formed with arms engaging the spools $6^a$ $6^b$, respectively, and is cut out to receive a pin $14^a$, projecting from the face of the worm-pinion 14, the teeth of which mesh with the worm $5^a$. On the stud-shaft 10, fixed in the plate $1^e$, is a beveled friction-pinion $10^a$, to which is secured a toothed pinion $10^b$. The beveled pinion $10^a$ is formed with an annular groove which is adapted to engage with the annular rib formed on the pinion 11, thus effecting a frictional contact which serves to drive the pinion $10^a$ and with it the pinion $10^b$, which, as we have seen, engages the cog $1^g$ of the gear-wheel $1^f$. A drive-pulley $4^c$ is fixed on the outer end of the shaft $4^b$, and a belt-pulley $9^d$ is mounted on said shaft near the said drive-pulley $4^c$. Mounted on the shaft $2^d$ is a similar belt-pulley $9^c$, and said pulleys $9^c$ $9^d$ are connected by a belt 9, provided with a series of perforations, which are reinforced by metallic frames or clips $9^a$, each formed with four points $9^b$, which are passed through the said perforations in the belt and clenched on the opposite side thereof, and rivets $9^c$, passed through two of the points and through the belt and through frame $9^a$. Suitable studs on the periphery of the pulleys $9^c$ $9^d$ engage these reinforced perforations in the belt 9, and thereby prevent the slipping of the belt, as will be readily understood.

The disk 13, which is mounted on the shaft $4^b$, is of sufficient diameter so that a portion thereof extends over and bears against the outer side of the disk $2^f$, so that when the said disk 13 is moved inwardly through the action of the clutch mechanism arranged on said shaft and brackets, as heretofore described, it will serve to move the disk $2^f$ inwardly and cause its pins $2^g$ to engage the recesses or depressions $1^j$ in the gear $1^f$, thereby rotating the last-named gear in the direction of rotation of the pulley $9^c$. Upon the outward movement of the said clutch mechanism the beveled pinion 11 will be brought into frictional engagement with the corresponding pinion $10^a$. Upon the rotation of the shaft $4^b$ the corresponding movement will be communicated to the gear $1^f$ through the pinion $10^b$.

It will be seen that the expansive action of the spring $2^e$ will tend to hold the disk $2^f$ out of engagement with the gear-wheel $1^f$ until such action of the spring is overcome by the inward movement of the disk 13 described. The construction and operation will produce a reciprocating rotary movement in the barrel 2 similar to that effected by the gearing above described and illustrated in Fig. 1.

Having thus described my invention, what I claim as new, and desire to obtain by Letters Patent, is—

1. In driving means for barrels, an axle secured to the driven element, a gear-wheel fixed on said axle and formed with cogs and recesses on opposite sides substantially as described, a pinion adapted to engage the cogs of said gear-wheel, a shaft parallel to said axle, pinions slidably and rotatably mounted on said shaft and adapted to alternately engage said gear-wheel and first-named pinion respectively, and means for sliding and means for rotating the pinions on the shaft.

2. In driving means for barrels, an axle secured to the driven element, a gear-wheel mounted on said axle and formed with cogs and recesses on its opposite sides, a pinion adapted to engage the gear-wheel cogs means adapted to engage the gear-wheel recesses, a shaft arranged parallel to said axle, elements slidably and rotatably mounted on said shaft and adapted to alternately engage said pinion and means respectively, and means for rotating and sliding said slidable and rotatable elements, substantially as set forth.

3. In driving mechanism for barrels, an axle for the barrel, a gear-wheel mounted on said axle, a stud-shaft, a pinion mounted on said stud-shaft and adapted to engage and rotate the said gear-wheel, a shaft arranged parallel to said axle and adapted to be driven, a worm on said shaft, means slidably mounted on said shaft and adapted to alternately engage and rotate the stud-shaft pinion and the gear-wheel, a worm-gear driven by the worm on the shaft and means operated by the worm-gear, and adapted to slide the first-mentioned means on the shaft.

4. In driving mechanism for barrels and the like, an axle for the barrel, a gear-wheel mounted on said axle and provided with recesses and cogs, a stud-shaft, a pinion mounted on said stud-shaft and provided with recesses and cogs the latter being adapted to engage the cogs of said gear-wheel, a bracket, a shaft journaled in said bracket and adapted to be driven, a worm on said shaft, a hub slidably mounted on said shaft, pinions secured on said hub and provided with studs adapted to alternately engage the recesses in the gear-wheel and the stud-shaft pinion respectively, a worm-gear mounted on said bracket and adapted to engage the worm on said shaft, means connecting said worm-gear with said hub and adapted to slide the latter.

5. In driving mechanism for barrels and the like, a frame, an axle secured to the barrel and supported by the frame, a gear-wheel mounted on said axle and provided in its periphery with recesses and cogs, a stud-shaft, a pinion mounted on said stud-shaft and provided with recesses and cogs the latter being adapted to engage the cogs of said gear-wheel, a bracket mounted on said frame, a shaft journaled in said bracket and adapted to be driven, a worm secured on said shaft, a hub slidably mounted on said shaft, two pinions secured on said hub and provided with studs adapted to alternately engage the recesses in the gear-wheel and stud-shaft pinion respectively, a worm-gear mounted on said bracket and adapted to engage the worm on said shaft, a lever having one end hinged to said bracket and having its opposite end forked and adapted to engage and slide the said hub, and a link connecting said lever with said worm-wheel, substantially as described.

6. In driving mechanism for barrels or the like, an axle for the driven element, a gear-wheel mounted on said axle, a shaft provided with a worm and adapted to be driven, means mounted on the shaft and adapted to alternately rotate the axle in opposite directions, a worm-gear driven by the worm on the shaft, and slidable means engaging the pinion and the means on the shaft, and adapted to be slid by the worm-gear.

In testimony whereof I affix my signature in presence of two witnesses.

MANFRED ALONZO BASLEY.

Witnesses:
O. K. TREGO,
B. B. COLLINS.